United States Patent [19]
Kotama

[11] Patent Number: 5,163,708
[45] Date of Patent: Nov. 17, 1992

[54] PRELOADER

[75] Inventor: Shigeru Kotama, Aichi, Japan

[73] Assignee: Kabushiki Kaisha Tokai-Rika-Denki-Seisakusho, Aichi, Japan

[21] Appl. No.: 696,192

[22] Filed: May 6, 1991

[30] Foreign Application Priority Data

May 21, 1990 [JP] Japan .................. 2-52810[U]

[51] Int. Cl.$^5$ ............................................. B60R 22/46
[52] U.S. Cl. .................... 280/806; 297/475; 297/478; 297/480; 242/107
[58] Field of Search ............ 280/801, 806, 807; 297/474, 475, 478, 476, 479, 480; 242/107.4 A, 107

[56] References Cited

U.S. PATENT DOCUMENTS

| 4,258,934 | 3/1981 | Tsuge et al. ............... 297/480 X |
| 4,328,976 | 5/1982 | Tsuge et al. ............... 297/479 X |
| 4,422,669 | 12/1983 | Chiba et al. ............... 297/480 X |
| 4,573,322 | 3/1986 | Föhl ........................... 280/806 X |
| 4,789,185 | 12/1988 | Föhl ........................... 297/476 X |

FOREIGN PATENT DOCUMENTS

| 3727666 | 3/1989 | Fed. Rep. of Germany ...... 280/806 |
| 63-25156 | 2/1988 | Japan . |

Primary Examiner—David M. Mitchell
Assistant Examiner—Tamara L. Graysay
Attorney, Agent, or Firm—Sixbey, Friedman, Leedom & Ferguson

[57] ABSTRACT

A preloader for use in a webbing retractor for allowing a webbing to be fitted closely around a vehicle occupant at the time of an emergency of a vehicle. The preloader includes a gas generating device for generating a gas instantaneously at the time of an emergency of the vehicle; a moving member adapted so as to be moved by the pressure of the gas; a force converting/-transmitting device connected to the moving member and adapted to move together with the moving member so as to convert the moving force of the moving member into a torque acting in a webbing taking-up direction and transmit the torque to a takeup shaft of the webbing retractor; and a force transmission preventing device for preventing the moving force of the moving member from being transmitted to the force converting/transmitting device when a load exceeding a predetermined value is applied by the force converting/-transmitting device to the moving member. When a force exceeding the predetermined value is applied by the force converting/transmitting device to the moving member with the webbing fitted closely around the occupant, the moving force of the moving member is prevented from being transmitted to the force converting/transmitting device by means of the force transmission preventing device. Hence, it is possible to prevent the webbing from being pulled excessively, that is, beyond a desired state in which the webbing is fitted closely around the occupant with an appropriate tightness, thereby preventing discomfort from being imparted to the occupant.

20 Claims, 8 Drawing Sheets

PRELOADER

BACKGROUND OF THE INVENTION

1. Field of the Invention

The present invention relates to a preloader for use in a webbing retractor or the like and adapted to allow a webbing to be applied to a vehicle occupant with appropriate tightness at the time of an emergency situation of a vehicle, i.e., at the time of a sudden deceleration of the vehicle.

2. Description of the Related Art

A seat belt apparatus is so arranged as to restrict a vehicle occupant by means of a webbing at the time of a sudden deceleration of a vehicle. If there is a large gap between the webbing and the occupant, however, it is impossible to sufficiently achieve the restraining performance. For this reason, there is a webbing retractor which is integrally provided with a preloader for allowing the webbing to be fitted closely around the occupant by forcibly pulling the webbing in the direction of retraction at the time of a sudden deceleration of the vehicle.

The preloader is actuated by a high-pressure gas generated suddenly by a gas generator filled with an explosive or the like.

At the time of a sudden deceleration of the vehicle, it is necessary for the preloader to pull the webbing with an appropriate force to cause the webbing to be fitted closely around the occupant. With the above-described conventional preloader, however, since the preloader is actuated by high-pressure gas produced suddenly by a gas generator provided with an explosive or the like, it is difficult to set the driving force of the preloader to an appropriate level. That is, if an attempt is made to cause the webbing to be fitted around the occupant with sufficient tightness, the webbing is pulled further than the state in which the webbing is fitted closely around the occupant with an appropriate fitting force. Accordingly, the webbing is fitted around the occupant with an excessive fitting force, thereby imparting discomfort to the occupant. Meanwhile, if an attempt is made to prevent the webbing from being pulled excessively, it becomes impossible to secure sufficient fitting force of the webbing with respect to the occupant owing to a shortage of gas pressure.

SUMMARY OF THE INVENTION

In view of the above circumstances, it is an object of the present invention to provide a preloader capable of preventing a webbing from being pulled excessively, that is, beyond the desired state in which the webbing is fitted closely around a vehicle occupant with an appropriate fitting force.

To this end, in accordance with the present invention, there is provided a preloader for use in a webbing retractor, for allowing a webbing to be fitted closely around a vehicle occupant at the time of an emergency of a vehicle, comprising: a gas generating device for generating a gas instantaneously at the time of an emergency of the vehicle; a moving member adapted to be moved by the pressure of the gas; a force converting/transmitting device connected to the moving member and adapted to move together with the moving member so as to convert the moving force of the moving member into a torque acting in a webbing taking-up direction and transmit the torque to a takeup shaft of the webbing retractor; and a force transmission preventing device for preventing the moving force of the moving member from being transmitted to the force converting/transmitting device when a load exceeding a predetermined value is applied by the force converting/transmitting device to the moving member.

With the preloader having the above-described construction, the moving member is moved by the pressure of a gas generated by a gas generating device at the time of a sudden deceleration of the vehicle. The moving force of this moving member is transmitted to the takeup shaft after it is converted to a torque acting in the webbing taking-up direction by the force converting/transmitting device. As a result, the webbing is fitted closely around the occupant. With the webbing thus fitted closely, when a load acts from the webbing on the moving member via the takeup shaft and the force converting/transmitting device, and when this load exceeds a predetermined value, the moving force of the moving member is prevented from being transmitted to the force converting/transmitting device by means of the force transmission preventing device. As a result, the webbing is prevented from being pulled excessively when the webbing is fitted closely around the occupant.

The above and other objects, features and advantages of the present invention will become more apparent from the following detailed description of the invention when taken in conjunction with the accompanying drawings.

DESCRIPTION OF THE PREFERRED EMBODIMENTS

Referring now to FIGS. 1 to 8, a description will be given of a webbing retractor 10 to which a preloader in accordance with the present invention is applied.

Figure 1:
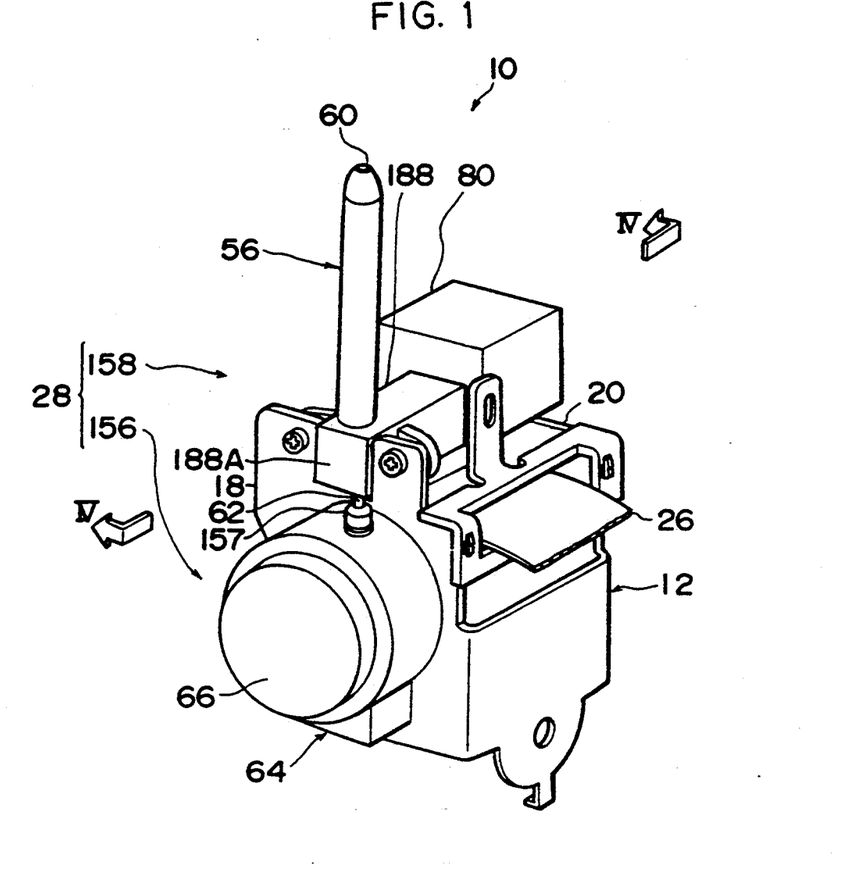
FIG. 1 is a perspective view of a webbing retractor to which a preloader in accordance with the present invention is applied.
Figure 2:
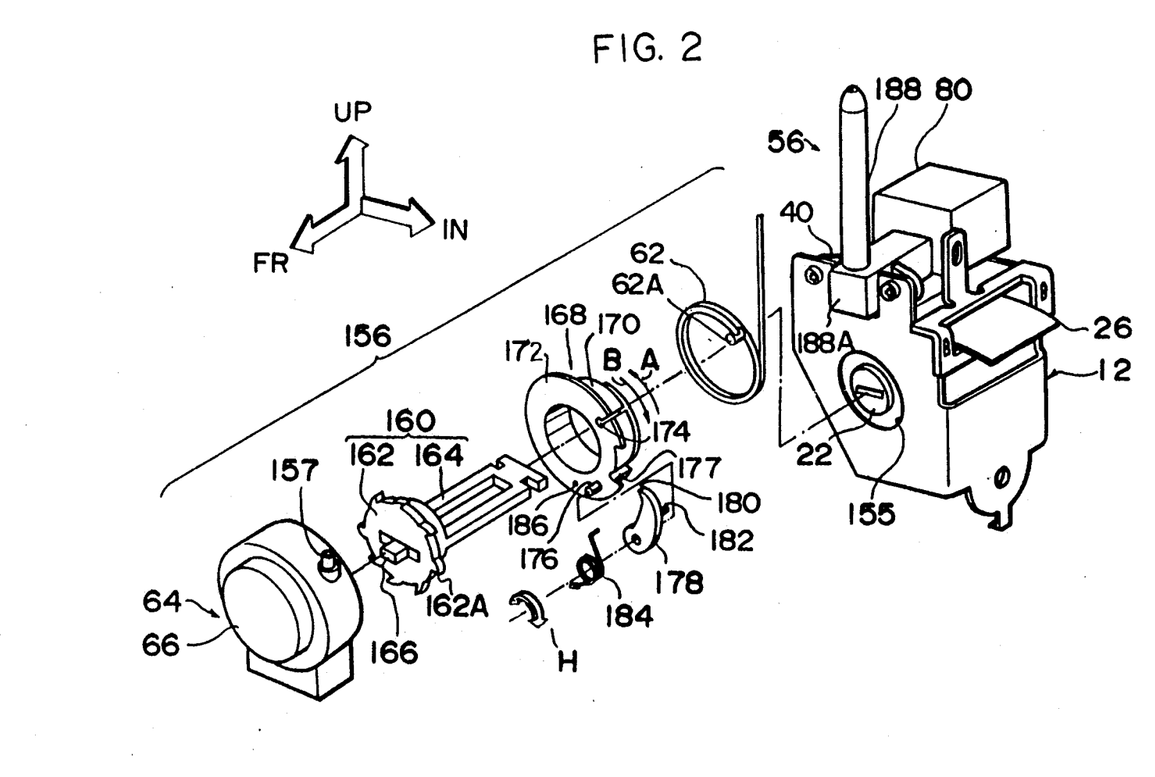
FIG. 2 is a partially exploded perspective view of a clutch unit of the preloader shown in FIG. 1.

As shown in FIG. 1, the webbing retractor 10 has a frame 12. The frame 12 has a pair of leg plates 18, 20 formed by bending opposite side portions thereof orthogonally toward the outside of a vehicle compartment in such a manner as to be parallel with each other. As shown in FIG. 2, each of the leg plates 18, 20 has a shaft supporting hole 155 formed in a substantially central portion thereof (only one leg plate 18 is shown in FIG. 2), respective opposite end portions of a takeup shaft 22 (see FIG. 2) being pivotally supported therein. A spool (not shown) is secured to an intermediate portion of the takeup shaft 22 coaxially with the takeup shaft 22. The distal end of a webbing 26 for restraining an occupant is retained at the spool.

Also, as shown in FIG. 1, the webbing retractor 10 is provided with a preloader 28 which comprises a clutch unit 156 disposed on the side of the leg plate 18 and a sensor unit 158 disposed on top of the pair of leg plates 18, 20.

As soon in FIG. 2, the clutch unit 156 has a spring complete 64. A cover 66 is formed on the spring complete 64 in such a manner as to project toward the front of the vehicle. In addition, a guide 157 for guiding a force converting/transmitting means in the form of which will be described later is formed on top of the spring complete 64. A ratchet wheel 160 is accommodated in the spring complete 64. In the ratchet wheel 160, a ratchet portion 162 and a tabular shaft portion 164 are formed integrally, and the shaft portion 164 is coupled with the takeup shaft 22 so as to rotate with the takeup shaft 22. Meanwhile, the ratchet portion 162 is a gear having ratchet teeth 162A formed around its outer periphery, and a boss 166 is formed at an axial portion of the ratchet portion 162 in such a manner as to project in an opposite direction to the shaft portion 164. This boss 166 is connected to the spring complete 64.

An unillustrated spiral spring is accommodated inside the cover 66 of the spring complete 64, and the outer end of the spiral spring is retained at the cover 66. The inner end of the spiral spring is retained by the boss 166 of the ratchet wheel 160. As a result, the takeup shaft 22 is urged in the webbing taking-up direction (in the direction of arrow A in FIG. 2) by means of the urging force of the spiral spring via both the ratchet portion 162 and the shaft portion 164, thereby taking up the webbing 26 in the form of a roll. In addition, the webbing 26 is capable of being drawn out as the takeup shaft 22 and the ratchet wheel 160 are rotated in the webbing drawing-out direction (in the direction of arrow B in FIG. 2) against the urging force of the spiral spring.

A substantially cylindrical rotating drum 168 is disposed between the leg plate 18 and the spring complete 64 outwardly of and coaxially with the shaft portion 164 of the ratchet wheel 160. An outer peripheral portion of the rotating drum 168 is formed as a winding portion 170, and a disk-shaped flange 172 is formed at the axial end of the rotating drum 168 on the spring complete 64 side. A retaining hole 174 with the configuration of a key slot is formed in an outer peripheral portion of the flange 172, and extends so as to form an open slit at the peripheral edge thereof. In addition, a pin 176 is formed on the flange 172 in such a manner as to project toward the spring complete 64 along the axial direction of the rotating drum. Formed between the retaining hole 174 and the pin 176 is a recess 177 extending between the outer peripheral edge of the flange 172 to the winding portion 170.

A pawl lever 178 is pivotally supported by the pin 176 of the rotating drum 168. The pawl lever 178 corresponds to the ratchet wheel 160, and a pawl portion 180 at the distal end thereof is engageable with any one of the ratchet teeth 162A of the ratchet portion 162. Formed on a central portion of the pawl lever 178 is a projection 182 projecting toward the rotating drum 168.

A torsion coil spring 184 is disposed on the pin 176 of the rotating drum 168 coaxially with the pawl lever 178. The torsion coil spring 184 has one end retained at a retaining hole 186 provided in the flange 172 and the other end retained by the pawl lever 178. Consequently, the torsion coil spring 184 urges the pawl portion 180 of the pawl lever 178 in a direction in which the pawl portion 180 moves away from the ratchet teeth 162A (in the direction of arrow H in FIG. 2). Accordingly, the ratchet wheel 160 is normally capable of rotating in both the webbing taking-up and drawing-out directions irrespective of the rotating drum 168 by virtue of the urging force of the torsion coil spring 184.

Figure 4:
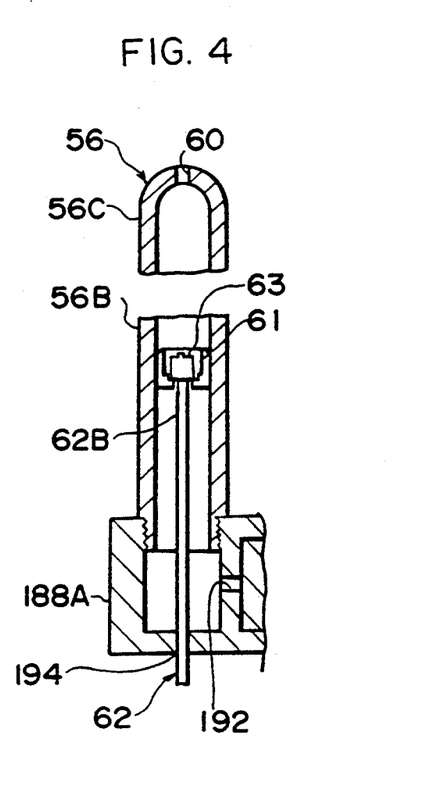
FIG. 4 is a cross-sectional view of the preloader taken line IV—IV in FIG. 1.
Figure 5:
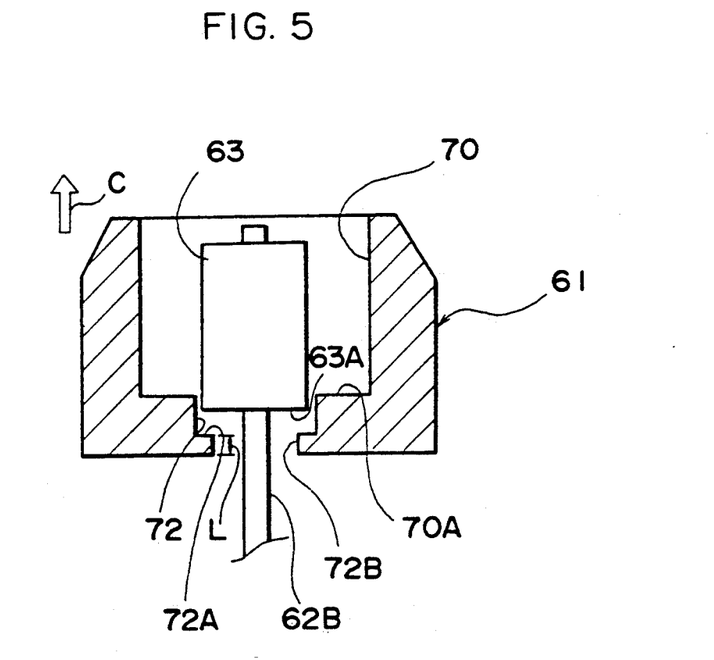
FIG. 5 is a cross-sectional view illustrating the arrangement of a piston and a weight of the preloader shown in FIG. 1.

An intermediate portion of the wire 62 is wound around the winding portion 170 of the rotating drum 168 in such a manner that the intermediate portion of the wire 62 draws the projection 182 of the pawl lever 178 to the side of the winding portion 170. An end piece 62A of the wire 62 is inserted in the retaining hole 174 of the flange 172 so as to be connected to the flange 172. In addition, as shown in FIGS. 4 and 5, a retaining or mass member in the form of a cylindrical weight 63 is secured to the other end 62B of the wire 62. The underside 63A of the weight 63 (the side thereof on the lower side of the vehicle) abuts against an inner portion of a moving member in the form of a piston 61 disposed in a cylinder 56 connected to the sensor unit 158 (see FIG. 1).

As shown in FIG. 1, the sensor unit 158 has a box-like sensor-accommodating portion 80 for accommodating a preloader sensor (not shown) and a box-like enhancer accommodating portion 188 projecting integrally from the sensor-accommodating portion 80 toward the front of the vehicle. A cylindrical enhancer (gas generating substance) 68 (see FIG. 3) is accommodated in the enhancer accommodating portion 188.

Figure 3:
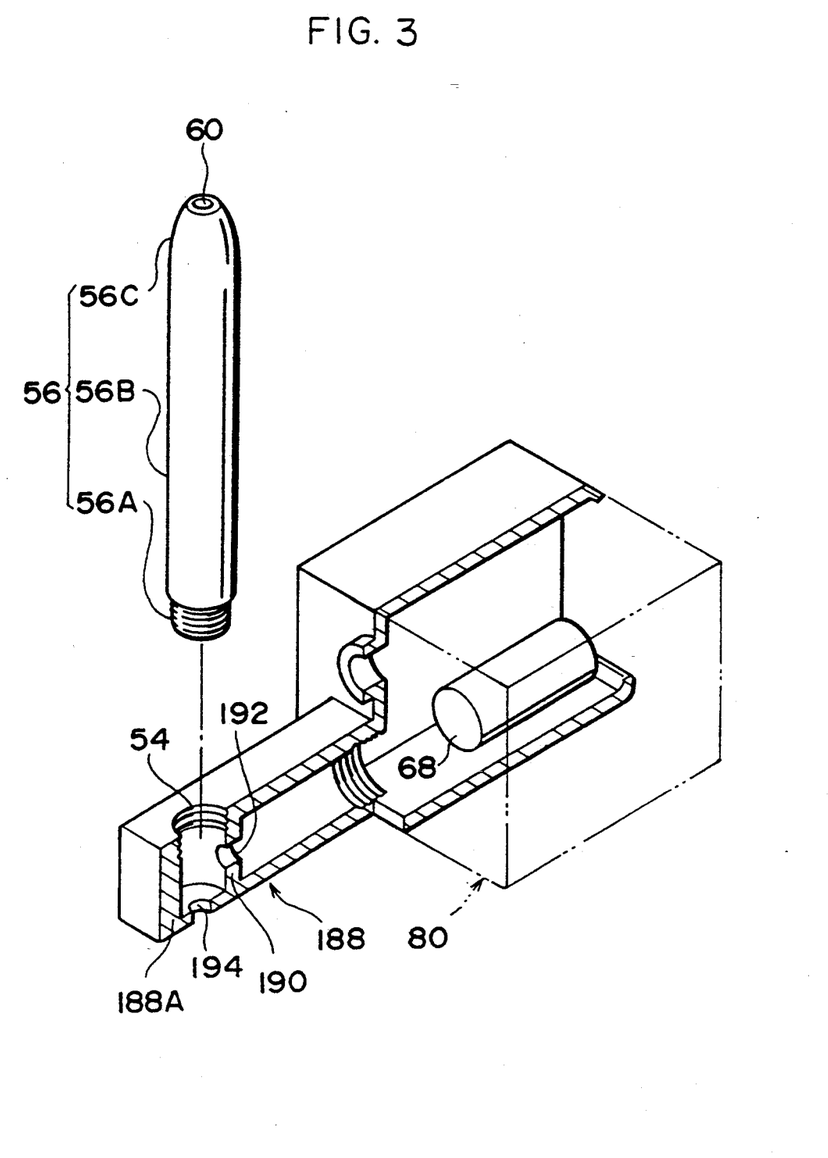
FIG. 3 is an exploded perspective view illustrating how a cylinder of the preloader shown in FIG. 1 is fitted.

As shown in FIG. 3, a partition wall 190 is formed integrally in the vicinity of a closed wall 188A at an end portion of the enhancer-accommodating portion 188, in parallel with the closed wall 188A. This partition wall 190 has a guide hole 192 formed in a substantially central portion thereof. A wire guiding hole 194 is formed in the bottom wall of the enhancer-accommodating portion 188 located on the lower side of the vehicle, between the closed wall 188A and the partition wall 190, in such a manner as to correspond to the guide 157 of the spring complete 64. A cylinder hole 54 disposed coaxially with the wire guiding hole 194 and having a diameter greater than that of the wire guiding hole 194 is formed in the upper wall of the enhancer-accommodating portion 188 located on the upper side of the vehicle. An internal thread is formed on the inner peripheral surface of the opening of this cylinder hole 54.

A cylinder 56 having a hollow cylindrical configuration and provided with a proximal end portion 56A, an axially intermediate portion 56B, and an axially distal end portion 56C, is disposed so as to have its proximal end portion at a position corresponding to the cylinder hole 54. The proximal end portion 56A has a diameter smaller than that of the axially intermediate portion 56B. In addition, an external thread is formed on the outer peripheral surface of the proximal end portion 56A and is threadedly engaged with the internal thread of the cylinder hole 54. The axially distal end portion 56C has a diameter which becomes gradually smaller toward the distal tip thereof (toward the upper side of the vehicle), and an air vent hole 60 is formed at the distal end thereof. The piston 61 (see FIG. 4) is slidably accommodated in the axially intermediate portion 56B.

As shown in FIG. 5, the piston 61 is formed into a hollow cylindrical configuration having a cylindrical recess 70 therein. A cylindrical recess 72 is formed coaxially with the recess 70 at a substantially central portion of the bottom portion 70A of the recess 70. A through hole 72B with a circular section is bored in a substantially central portion of the bottom portion 72A of the recess 72. The underside 63A of the aforementioned weight 63 abuts against the bottom portion 72A. A cancelling device in the form of the thickness L of the bottom portion 72A is set in such a manner that the bottom portion 72A is broken when a force exceeding a predetermined value acts upon it at the time of a sudden deceleration of the vehicle, that is, when the piston 61 is pushed in the upward direction of the vehicle (in the direction of arrow C in FIG. 5) and the weight 63 is pushed sharply upward thereby. The aforementioned predetermined value is set to such a value that the tensile force of the wire 62 is not imparted to the takeup shaft 22 as an excessive torque acting in the webbing taking-up direction, i.e., to such a value that the webbing 26, when pulled in a state in which it is fitted closely around the occupant, does not impart discomfort to the occupant.

An acceleration sensor for detecting a sudden deceleration of the vehicle and a lock mechanism for instantaneously preventing the rotation of the takeup shaft 22 in the webbing drawing-out direction by actuation of the acceleration sensor (neither are shown), are provided in conjunction with the webbing retractor 10 incorporating the preloader constructed as described above.

In addition, in a case where the webbing retractor 10 is used for a three-point seat belt apparatus of a continuous webbing type, the end of the webbing 26 paid out from the takeup shaft 22 is retained by a chassis via an unillustrated anchor member, an intermediate portion thereof is folded back at an unillustrated slip joint retained by the chassis, and an unillustrated tongue plate is fitted to an intermediate portion thereof between the anchor member and the slip joint in such a manner as to be slidable in the longitudinal direction of the webbing 26. As the occupant seated in the seat causes the webbing 26 to be paid out from the takeup shaft 22 and engages the tongue plate with a buckle device disposed on the chassis, the occupant assumes a webbing-applied state.

The operation of this embodiment will be described hereinafter.

After the occupant puts on the webbing 26, in the normal running state of the vehicle, the takeup shaft 22 is capable of rotating in both the webbing taking-up and drawing-out directions. Accordingly, since the webbing 26 is freely paid out from or taken up onto the takeup shaft 22 in response to changes in the posture of the upper part of the occupant's body, the occupant is not restrained.

In this state, when the vehicle undergoes sudden deceleration, the sensor unit 158 detects the sudden deceleration of the vehicle, and the enhancer 68 undergoes a reaction on the basis of the detection, thereby generating a large amount of gas instantaneously. This gas passes through the guide hole 192 and is guided into the cylinder 56 where the gas, under high pressure, pushes the piston 61 upward in the direction of arrow C in FIG. 5 (in the upward direction of the vehicle).

As a result, the weight 63 abutting against the bottom portion 72A of the piston 61 is pushed sharply in the upward direction of the vehicle, with the result that the wire 62 is instantly pulled upward. Hence, the intermediate portion of the wire 62 wound around the winding portion 170 of the rotating drum 168 becomes taut, and the tensile force of the wire 62 is imparted to the rotating drum 168. As a result, the rotating drum 168 is suddenly rotated in the webbing taking-up direction of the takeup shaft 22 (in the direction of arrow A in FIG. 2). At the same time, as the intermediate portion of the wire 62 becomes taut, the projection 182 of the pawl lever 178 is rotated, causing the pawl lever 178 to move toward the axis of the rotating drum 168 against the urging force of the torsion coil spring 184. Consequently, the pawl portion 180 of the pawl lever 178 engages with one of the ratchet teeth 162A of the ratchet wheel 160, with the result that the torque of the rotating drum 168 in the webbing taking-up direction is suddenly imparted to the ratchet wheel 160.

When the torque of the takeup shaft 22 in the webbing taking-up direction is imparted to the ratchet wheel 160 by means of the rotating drum 168, the takeup shaft 22 connected to the ratchet wheel 160 also rotates suddenly in the webbing taking-up direction. As a result, the webbing 26 is forcibly pulled in the taking-up direction so as to be fitted closely around the occupant.

At approximately the same time, the webbing 26 tends to be paid out from the webbing retractor 10 owing to the inertial movement of the occupant, but the unillustrated lock mechanism for instantaneously preventing the rotation of the takeup shaft 22 in the webbing drawing-out direction is actuated to prevent the rotation of the takeup shaft 22 in the webbing drawing-out direction. As a result, the occupant is retained positively in the state in which the webbing 26 is fitted closely around the occupant.

Meanwhile, when the force applied to the bottom portion 72A of the piston 61 exceeds a predetermined value, at the time when the piston 61 is pushed upward in the direction of arrow C in FIG. 5 (in the upward direction of the vehicle) with the webbing 26 fitted closely around the occupant, the bottom portion 72A is broken by the force. As a result, the weight 63 is put into a free state in which the underside 63A of the weight 63 does not abut against the bottom portion 72A. Accordingly, the tensile force applied to the wire 62 stops, so that the torque acting in the webbing taking-up direction with respect to the takeup shaft 22 is restrained. Hence, the webbing 26 is prevented from being pulled excessively when the webbing 26 is fitted closely around the occupant, thereby preventing discomfort from being imparted to the occupant.

Figure 6:
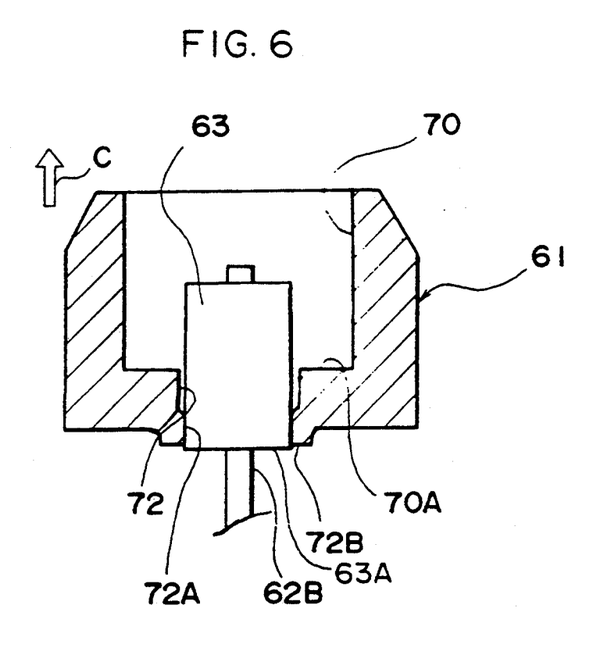
FIG. 6 is a cross-sectional view illustrating the arrangement of the piston and the weight in a case where a part of the piston is deformed downwardly.

Although in the above-described arrangement the transmission of torque to the takeup shaft 22 is prevented by virtue of the bottom portion 72 being broken when a force exceeding the predetermined value is applied to the bottom portion 72A of the piston 61, an alternative cancelling device may be provided in which, as shown in FIG. 6, the bottom portion 72A is deformed in the downward direction of the vehicle when a force exceeding the predetermined value is applied to the bottom portion 72A, so as to prevent the driving force from being transmitted to the takeup shaft 22.

Figure 7:
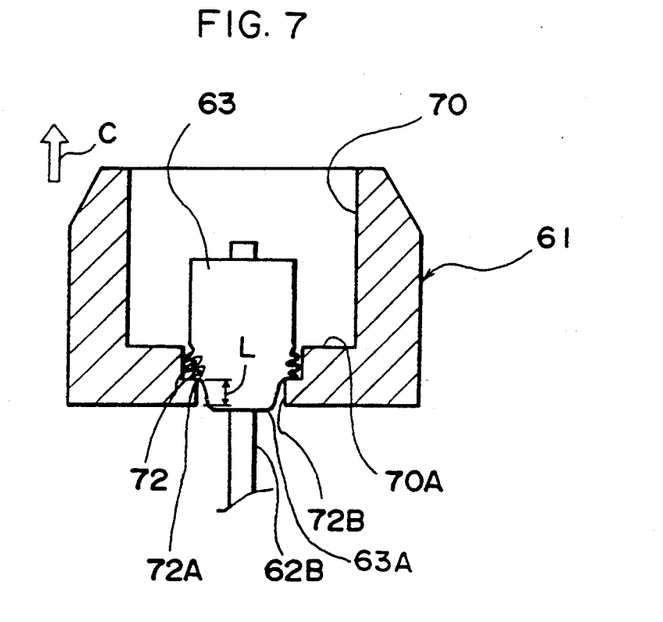
FIG. 7 is a cross-sectional view illustrating the arrangement of the piston and the weight in a case where the weight is deformed.

In addition, as shown in FIG. 7, a cancelling device may be provided such that the weight 63 is broken or deformed when a force exceeding the predetermined value is applied thereto, so as to prevent the driving force from being transmitted to the takeup shaft 22.

Figure 8:
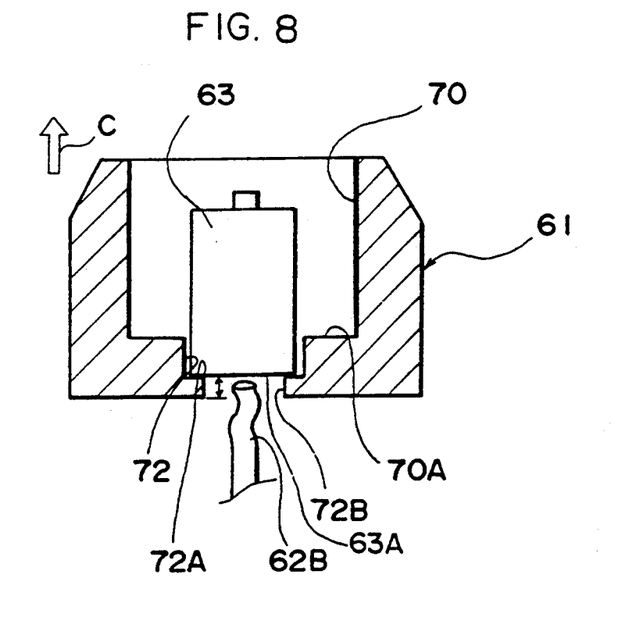
FIG. 8 is a cross-sectional view illustrating the arrangement of the piston, weight, and wire in a case where the wire is disconnected from the weight.

Alternatively, as shown in FIG. 8, a cancelling device may be provided such that the wire 62 is disconnected from the weight 63 when a force exceeding the predetermined value is applied to the bottom portion 72A of the piston 61.

As described above, when a force exceeding the predetermined value is applied from the force converting/transmitting device to the moving member with the webbing fitted closely around the occupant, the moving force of the moving member is prevented from being transmitted to the force converting/transmitting device by means of the force transmission preventing device. As a result, it is possible to prevent the webbing from being pulled excessively when the webbing is fitted closely around the occupant, thereby preventing discomfort from being imparted to the occupant.

What is claimed is:

1. A preloader for use in a webbing retractor for allowing a webbing to be fitted closely around a vehicle occupant at the time of an emergency of a vehicle, comprising:

gas generating means for generating a gas instantaneously at the time of an emergency of the vehicle;

a moving member adapted so as to be moved by the pressure of said gas;

force converting/transmitting means connected to said moving member and adapted to move together with said moving member so as to convert the moving force of said moving member into a torque acting in a webbing taking-up direction and transmit said torque to a takeup shaft of said webbing retractor; and force transmission preventing means comprised of a cancelling device for cancelling a connection between said moving member and said force converting/transmitting means for preventing the moving force of said moving member from being transmitted to said force converting/transmitting means when a load exceeding a predetermined value is applied by said force converting/transmitting means to said moving member.

2. A preloader according to claim 1, wherein said force converting/transmitting means is connected to said moving member in a first condition, and said canceling device cancels said connection by changing said connection to a second condition.

3. A preloader according to claim 2, wherein said canceling device has a structure in which said connection is canceled when a portion of said force converting/ transmitting means connected to said moving member is broken by means of interaction between a load from said force converting/transmitting means and said gas pressure.

4. A preloader according to claim 2, wherein said canceling device has a structure in which said connection is canceled when a portion of said force converting/ transmitting means connected to said moving member is deformed by means of an interaction between a load from said force converting/transmitting means and said gas pressure.

5. A preloader according to claim 2 wherein said canceling device has a structure in which said connection is canceled when said force converting/transmitting means is disconnected from said moving member by means of an interaction between a load from said force converting/transmitting means and said gas pressure.

6. A preloader according to claim 2, wherein said force transmission preventing means has a structure in which said connection is canceled when said force converting/transmitting means is disconnected from said moving member by means of an interaction between a load from said force converting/transmitting means and said gas member.

7. A preloader according to claim 1, further comprising: a retaining member for connecting said force converting/transmitting means to said moving member.

8. A preloader according to claim 7, wherein said force transmission preventing means has a structure in which said retaining member is adapted to break a portion of said moving member by means of an interaction between a load from said force converting/transmitting means and said gas pressure.

9. A preloader according to claim 7, wherein said force transmission preventing means has a structure in which said retaining member is adapted to deform a portion of said moving member by means of an interaction between a load from said force converting/transmitting means and said gas pressure.

10. A preloader according to claim 7, wherein said force transmission preventing means has a structure in which said retaining member is adapted to be deformed by said moving member by means of an interaction between a load from said force converting/transmitting means and said gas pressure.

11. A preloader for use in a webbing retractor for allowing a webbing to be fitted closely around a vehicle occupant at the time of an emergency of a vehicle, comprising:

gas generating means for generating a gas instantaneously at the time of an emergency of the vehicle;

a cylindrical member for accommodating said gas therein;

a piston adapted to move in said cylindrical member by means of the pressure of said gas;

a mass member disposed in a recess formed in said piston;

force converting/transmitting means provided with an elongated member having one and connected to said mass member, said force converting/transmitting means being adapted to move together with said piston so as to convert the moving force of said piston into a torque acting in a webbing taking-up direction and to transmit said torque to a takeup shaft of said webbing retractor; and force transmission preventing means comprised of a cancelling device for cancelling a connection between said piston and said force converting/transmitting means for preventing the moving force of said piston from being transmitted to said force converting/transmitting means when a load exceeding a predetermined value is applied by said force converting/transmitting means to said piston.

12. A preloader according to claim 11, wherein said canceling device has a structure in which said mass member is adapted to break a thin portion of said piston forming said recess, by means of an interaction between a load from said force converting/transmitting means and said gas pressure.

13. A preloader according to claim 12, wherein said thin portion of said piston forming said recess has such a thickness that said thin portion is broken by said mass member when a load exceeding a predetermined load is applied to said piston.

14. A preloader according to claim 11, wherein said cancelling device structure in which said mass member is adapted to be deformed by a thin portion of said piston forming said recess, by means of an interaction between a load from said force converting/transmitting means and said gas pressure, 15. A preloader according to claim 11, wherein said cancelling device has a structure in which said elongated member is adapted to be disconnected from said mass member by means of an interaction between a load from said force converting/transmitting means and said gas pressure.

16. A preloader according to claim 11, wherein said cancelling device has a structure in which said mass member is adapted to deform a thin portion of said piston forming said recess, by means of an interaction between a load from said force converting/transmitting means and said pas pressure.

17. A preloader according to claim 11, wherein said predetermined value is set to such a value that said force transmission preventing mass prevents the transmission of a tensile force applied to said elongated member from said force converting/transmitting means to said takeup shaft of said webbing retractor as an excessive torque acting in the webbing taking-up direction.

18. A preloader for use in a webbing retractor for allowing a webbing to be fitted closely around a vehicle occupant at the time of an emergency of a vehicle, comprising:

gas generating means for generating a gas instantaneously at the time of an emergency of the vehicle;

a cylindrical member for accommodating said gas therein;

a cylindrical piston provided with a first cylindrical recess having an axis in a longitudinal direction thereof, said piston being adapted to be moved in said cylindrical member by means of the pressure of said gas;

a mass member disposed in a second cylindrical recess formed in a substantially central portion of the bottom of said first recess, coaxially with said first recess, the diameter of said second recess being smaller than that of said first recess and greater than that of a through hole with a circular section formed in a substantially central portion of the bottom of said second recess; and force converting/transmitting means provided with an elongated member having one end connected via said through hole to said mass member, said force converting/transmitting means being adapted to move together with said piston so as to convert the moving force of said piston into a torque acting in a webbing taking-up direction and to transmit said torque to a takeup shaft of said webbing retractor, wherein the moving force of said piston is prevented from being transmitted to said force converting/transmitting means when said mass member breaks a protruding portion of said piston forming said second recess and said through hole by means of an interaction between a load from said force converting/transmitting means and said gas pressure, when a load exceeding a predetermined value is applied by said force converting/transmitting means to said piston.

19. A preloader according to claim 18, wherein said protruding portion has such a thickness that said protruding portion is broken by said mass member when a load exceeding a predetermined value is applied to said piston.

20. A preloader according to claim 18, wherein said predetermined value is set to such a value that said force transmission preventing means prevents the transmission of a tensile force applied to said elongated member from said force converting/transmitting means to said takeup shaft of said webbing retractor as an excessive torque acting in the webbing taking-up direction.

* * * * *